Sept. 17, 1968  Z. P. MORA  3,401,458

CHROMOSOME ANALYZER AND METHOD

Filed May 28, 1965

INVENTOR

United States Patent Office
3,401,458
Patented Sept. 17, 1968

3,401,458
CHROMOSOME ANALYZER AND METHOD
Zoltan Paul Mora, 1917 G St. NW.,
Washington, D.C. 20006
Filed May 28, 1965, Ser. No. 459,693
9 Claims. (Cl. 33—1)

ABSTRACT OF THE DISCLOSURE

Chromosome analysis device and method in which a transparent surface having positioning markings thereon is used to dispose a representation of an average set of chromosomes each in proper shape and relative size and position as they would appear in a standard enlarged photomicrograph of a standard set of chromosomes for purpose of quick comparison with a set of chromosomes to be analyzed. A set of such surfaces may be provided which differ by each including an average representation of a particular type of abnormal chromosome.

---

Figure 1:
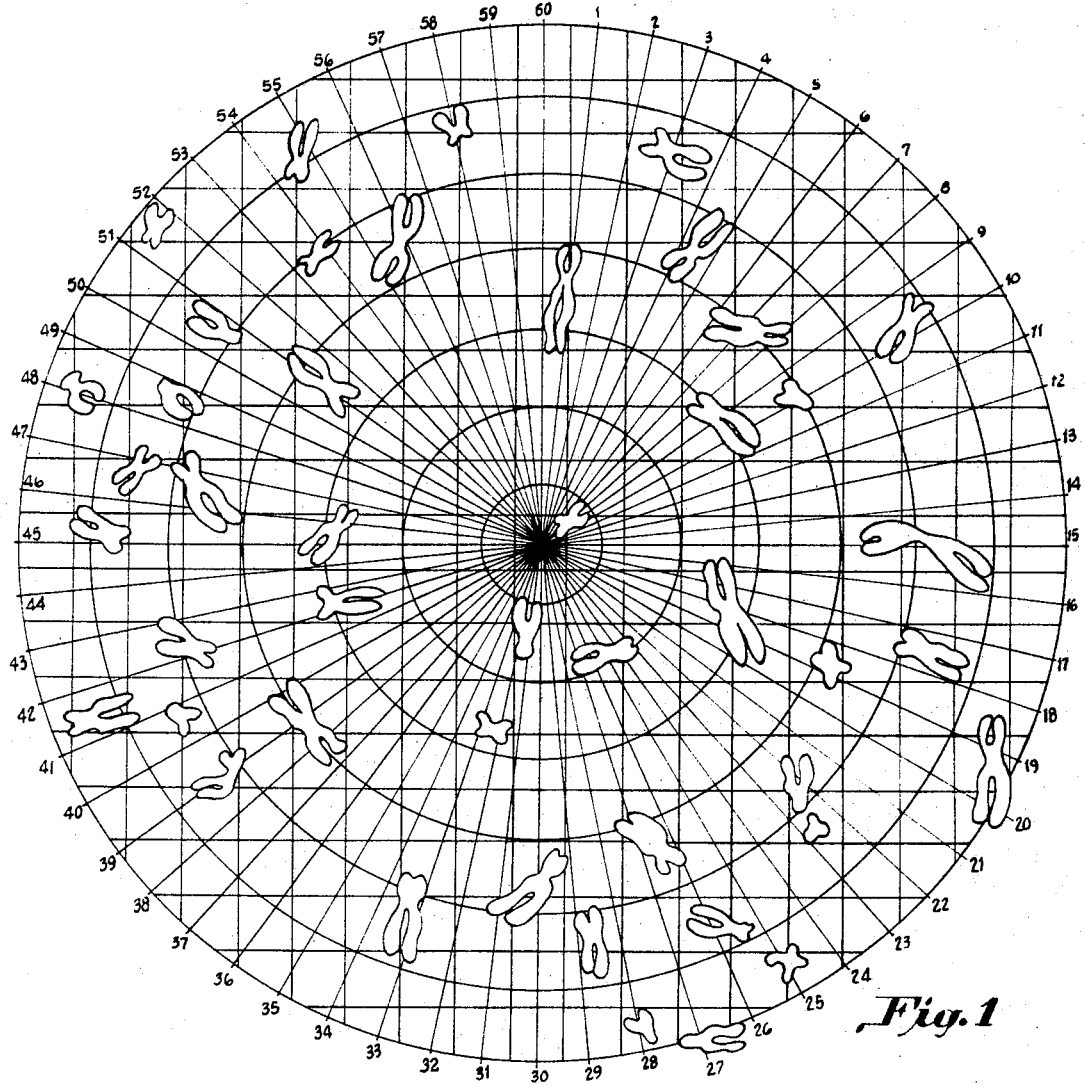

My invention relates to a chromosome standard measuring device useful as a measuring instrument in substitution for estimation by the eye of chromosomes. In the past scientifically and practically adequate tools for measuring the size of chromosomes and their other useful characteristics were not available. Particularly the device hereof can measure their deviation from the regulars; for including exact determination of the position of the chromosomes, and comparison of size, form and position with the chromosomes of model cells.

Chromosome analysis is not only acknowledged, but appreciated all over the world as a practical clinical diagnostical procedure and as a scientific research method.

One of the smallest particles of every organic (living) being is the cell. However the development of the microscope made visible not only the different kinds of cells, but their structural composition too. Cells consist as a rule of two important parts: the nucleus and the cytoplasm. Further developments made visible some small particles inside the cells; namely the chromosomes. The chromosomes are the bearers of the individuality of the being in question and at the same time are the transfer-bodies (through the genes) of the inheritable features of the individual. The number of the chromosomes (determined with exactitude only 9 years ago) are for a normal healthy human individual 46, comprising 22 pairs of chromosomes (autosomes) and 2 sex chromosomes. The sex chromosomes of a man (male) are different from those of a woman (female). The chromosomes of each being are always in development; therefore their form is changing. However when considered at the same period of development they are identical. The group (made on the basis of an internationally accepted system) of chromosomes of an individual is called a karyotype. There are no two individuals with identical karyotypes. This peculiarity of individuality of the chromosome karyotypes is similar to the variety of the fingerprints and thus makes them able to serve as identification tools.

The number of diseases recognized to be present in connection with some chromosome aberrations is ever increasing and furthermore my hypothesis is that all hereditary diseases and all those which are due to irregular cell-metabolism are consequences of some irregularity in: (a) number, (b) form, and/or (c) size of the chromosomes or some of them. Consequently, the present technique of chromosome analysis is very primitive. That is obvious, because this part of the "Medical Genetics" is in a very early phase. No significant detections are older than 10 years.

Chromosomes are visible in clinical laboratory microscopes. However their size is so minuscule as seen in these microscopes, that analyzing, pairing and grouping of them is impossible. The preliminary phases of the whole investigation are: (a) culturing, (b) harvesting, (c) putting on slides. In order to make the analysis possible, a microphotograph must be taken and the photograph has to be enlarged. These enlarged pictures of chromosomes are cut out from the print, then paired according to their size and form. Such chromosome-group is the karyotype referred to above. This method is very primitive. It gives a positive and nearly exact answer only as to the number of the chromosomes and as to the roughest aberrations of forms and size. However the exact form and the exact size of the chromosomes is also an important factor and so the position of them with respect to each other may also have some importance.

Figure 2:
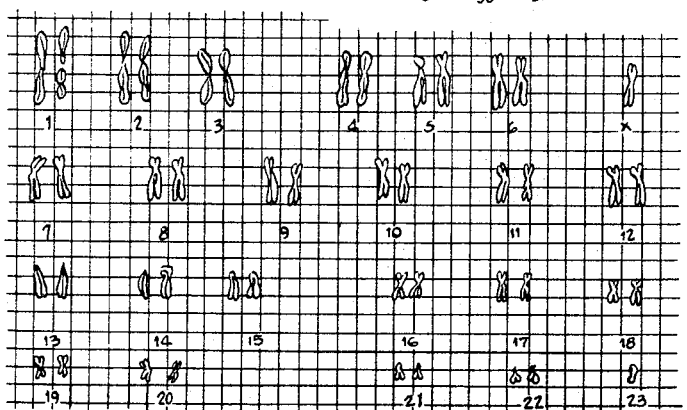

In the drawing,

FIG. 1 shows the marking of a transparent template with grid lines and chromosome representations in accordance with the invention, and FIG. 2 illustrates a karyotype.

As mentioned, my invention replaces inaccurate visual estimation with tools allowing exact scientific measurement.

The tool is a template made of transparent plastic or of any kind of transparent material. The outlines of the several forms of normal chromosomes will be printed on this surface properly distributed as a chromosome map herein called a "chromosome analyzer." On the chromosome analyzer a grid will also be printed as a standard to the usual enlargement scale of microphotography clinical or research laboratories. On this map, for example, the distance unit will be a millimicron. The map itself will be a large circle, similar to a dial plate. From the center of the circle, radii numbered consecutively from 1 to 60 will extend to the periphery of the circle dividing the circle in sixty equal parts like the minutes of a clock dial. Inside the peripheral circle there will be concentric circles disposed at predetermined distances such as 1 millimicron. With the use of this chromosome map, the position of each chromosome can be determined by the number of the "minutes" of the nearest cutting radius showing, and by the number of the nearest concentric circle including or cutting the chromosome. A rectangular grid of lines may be provided as shown in FIG. 1 as another means of determining the relative positions of the chromosomes.

There will be separate maps with the designs of the peripheries of the chromosomes of model cells; separately for men and women, or any other kind of karyotype of healthy (normal) human being (infants, adults, aged, etc.). When such model-map is placed over the individual karyotype being investigated the clinical laboratory technologist or the research scientist is able to determine the deviations from the model and describe them with scientifically determinable data comparable on an international level.

There may, for example, be separate maps for identifying the chromosome aberrations, which may be the causes or effects of some diseases such as Down syndrome, De Guiguelmo syndrome, cancer, leukemia, intersexuality, etc. Moreover these maps will facilitate the investigation of the effects of radiations on the constitution (form, size, etc.) of the chromosomes eventually before clinical symptoms. (This is proven by cancer of the cervix.)

Thus it will be obvious that the scale and relative positions and size of chromosome and any aberrations appearing in the same microscopic enlargement from a living cell to be tested may be compared with said standard and allow orientation and positioning of aberrations thereon as well as displaced positions of normal chromosomes being tested to identify the test cell as to changes in type and position in its pattern by comparison with said device.

According to this invention it is also useful to project an enlarged microphotograph on photosensitive paper provided with the same printed grid design as described above.

My invention may also be used by projecting the picture of a model-map on a calibrated eyepiece of the microscope. This eyepiece can be used inserted in a regular microscope, whereby the viewer sees the subject exposed chromosomes therein against the background of the standard in the eyepiece. It is also very advantageous if the eyepiece is able to make possible some enlargement of the original picture visible in the microscope itself.

Various modifications will occur to those skilled in the art. For instance, a standard plate made up wherein the chromosomes are printed in colored ink would be readily distinguishable from the grid and concentric spherical lines. Moreover, it is possible to make up a grid plate in which only known aberrations in the chromosomes are indicated thereon in colored ink, such as De Guiguelmo syndrome, cancer, leukemia, Down syndrome, etc., all other chromosome irregularities typical of some human abnormality. Thus normal chromosomes and abnormal chromosomes can be indicated either on the same transparent surface or on separate transparent surfaces comprising a set. It is also useful within the scope of this invention to provide a photosensitive paper having a standard grid with radii and concentric circles printed thereon properly sized to take chromosome enlargement photographically printed thereon, oriented upon the pre-printed grid on the photographically sensitized paper.

As thus described, applicant here provides a linear coordinate system of markings on a transparent surface such as concentric circles having radial markings emanating from the center which extend at least to the outermost circle as coordination points, so that the position and size of the chromosomes can be determined relative to each other when they, too, are marked on that surface in the position in which they would normally appear from a photographic enlargement of their microscopic appearance in an individual cell of the same type as that being tested.

FIG. 1 shows a grid marking of horizontal and vertical lines of such surface, but it is preferred as shown in FIG. 1, to use both types of coordinates to facilitate the measurement of the position of the chromosomes thereon. A group of marked surfaces comprising a set of such standards will be made for numerous types of individuals, male, female and at various age levels, so that a complete set of standards will be available to the test laboratory or physician who wishes to test the chromosomes of a particular living cell to be identified. Similarly, such set may include standards for abnormalities, typically metabolic diseases or sex abnormalities, so that a complete standard may be used for recognizing persons or living cellular matter which is healthy as well as persons or other living body having some abnormality. Moreover, the test device may be used in the many ways as set forth above and in the claims.

I claim:

1. A device for chromosome analysis comprising a set of standard transparent sheets each having visible coordinated markings thereon establishing the scale and relative positions over the area of the sheet, each sheet further having marked thereon a pattern of microscopically enlarged chromosomes representing an average of chromosome arrangement patterns of numerous individuals of a similar age group and class, said representations being marked over said coordinated markings and arranged thereon in average relative position, size and shape to constitute a standard, each marked sheet of said device being useful for comparison with living cells of an individual to be tested of the same age group and class as the chromosomes of said living cells would normally appear to the same microscopic enlargement, the respective sheets of said set corresponding to different age groups and classes of individuals.

2. A set of chromosome comparative standards as defined in claim 1 further including surfaces having marked and positioned on some of said sheets representations of average chromosome standards of common abnormalities, the representations of said abnormal chromosomes being distinctively marked.

3. The method of analyzing chromosomes comprising comparing a microscopically enlarged view of the chromosomes of an individual being tested against a preformed standard of chromosomes visibly marked on a transparent surface having visible markings thereon establishing scale and relative positions over the area of said surface and having marked thereon the pattern of microscopically enlarged chromosomes representing an average of chromosome arrangement patterns of numerous individuals, representations being marked over said coordinated markings and arranged thereon in average relative position, size and shape to constitute a standard, said device being useful for comparison with living cells of an individual to be tested as the chromosomes of said living cells would normally appear to the same microscope enlargement.

4. The method as defined in claim 3 wherein the linear measuring coordinates marked on said transparent surface are a series of concentric circles having equally spaced radii emanating from the center point of said circles.

5. The method as defined in claim 3 wherein the linear measuring coordinates marked on said transparent surface are a grid of spaced parallel horizontal and vertical lines.

6. The method as defined in claim 3 wherein the transparent surface has marked thereon a grid of horizontal and vertical lines having superimposed a series of concentric spaced circles having equally spaced radii emanating from the center point of said circles and extending at least to the outermost circle.

7. The method as defined in claim 3 wherein the preformed standard is selected from a set of said marked surfaces each having chromosomes disposed thereon in relative position, size and shape to correspond each to one of a group of individuals variable in age and sex as a standard set for rapid comparison with individuals whose chromosomes are being tested.

8. The method as defined in claim 3 wherein the transparent surfaces bearing said markings including chromosome distributions each form part of the eyepiece of a microscope whereby the standard chromosome marks thereon form a visible comparator background for viewing and comparing living chromosomes in a microscope.

9. The method as defined in claim 3 wherein each transparent surface comprises a photosensitive film upon which may be photomicrographically recorded the chromosomes enlarged from a microscope slide of a living cell for standard comparative analysis.

References Cited

UNITED STATES PATENTS

| | | | |
|---|---|---|---|
| 1,198,053 | 9/1916 | Porter | 33—1 |
| 1,423,019 | 7/1922 | Pogue | 33—1 |
| 2,007,589 | 7/1935 | Williams | 33—1 |
| 2,007,986 | 7/1935 | Sprague | 33—1 |
| 2,048,879 | 7/1936 | Moran | 33—1 |
| 2,834,110 | 5/1958 | Malakoff | 33—1 |
| 3,106,778 | 10/1963 | Stoneham | 33—1 |
| 3,161,957 | 12/1964 | Kach | 33—1 |
| 2,431,666 | 11/1947 | Fassin | 88—1 X |
| 3,102,459 | 9/1963 | Zimberoff | 88—24 X |

FOREIGN PATENTS

| | | |
|---|---|---|
| 128,264 | 6/1919 | Great Britain. |
| 275,826 | 9/1951 | Switzerland. |

ROBERT B. HULL, *Primary Examiner.*